United States Patent [19]

Nakamura

[11] Patent Number: 5,079,765
[45] Date of Patent: Jan. 7, 1992

[54] NETWORK SYSTEM HAVING A GATEWAY APPARATUS FOR MOMITORING A LOCAL AREA NETWORK

[75] Inventor: Yasuo Nakamura, Yokohama, Japan
[73] Assignee: Canon Kabushiki Kaisha, Tokyo, Japan
[21] Appl. No.: 460,537
[22] Filed: Jan. 3, 1990
[30] Foreign Application Priority Data
  Jan. 9, 1989 [JP] Japan .................. 1-1232
[51] Int. Cl.⁵ .............................................. H04J 3/02
[52] U.S. Cl. ................... 370/85.13; 370/85.1; 340/825.08
[58] Field of Search ................ 370/85.12, 85.13, 85.1, 370/16, 85.4; 320/85.8, 91, 92, 94.1, 95.2; 340/825.06, 825.07, 825.08, 825.16, 825.17

[56] References Cited

U.S. PATENT DOCUMENTS

| | | | |
|---|---|---|---|
| 4,607,256 | 8/1986 | Henzel | 370/85.4 |
| 4,637,013 | 1/1987 | Nakamura | 370/85.1 |
| 4,663,748 | 5/1987 | Karbowiak | 370/85.12 |
| 4,750,171 | 6/1988 | Kedar | 370/85.1 |
| 4,785,449 | 11/1988 | Nakamura et al. | 370/85.1 |
| 4,825,204 | 4/1989 | Nakamura | 340/825.52 |
| 4,897,837 | 7/1989 | Morales | 370/16 |
| 4,926,375 | 5/1990 | Mercer | 370/85.12 |

Primary Examiner—Douglas W. Olms
Assistant Examiner—H. Kizou
Attorney, Agent, or Firm—Fitzpatrick, Cella, Harper & Scinto

[57] ABSTRACT

A network system includes a local area network to which a plurality of transmission apparatuses are connected, a gateway apparatus for connecting the local area network to a wide area network, and a plurality of terminal adapters for connecting the local area network to communication terminal apparatuses, and a management method therefor. Each transmission apparatus sends a transmission request of management data requesting data on the operating conditions of the connected local area network, the gateway apparatus, and the terminal adapters, acquires data on the operating conditions of the other apparatuses sent in response to the transmission request, and simultaneously displays the acquired management data, so that the operating conditions of the apparatuses connected to the system can always be monitored. Even when a communication error occurs, location of the source of the error can be easily determined without arranging a special-purpose LAN monitoring apparatus.

6 Claims, 12 Drawing Sheets

|  | AD i | TYPE i | LINK i |
|---|---|---|---|
| NODE 1 | 1 | GW | 1 |
| NODE 2 | 5 | PC | |
| NODE 3 | 10 | TA | 1 |
| NODE 4 | 11 | 0 | 0 |
| NODE 5 | 12 | TA | 0 |
| NODE 6 | 13 | TA | 1 |

F I G. 10

NETWORK MANAGEMENT MONITOR     * * *     1988  05/31  15:33

| NODE ADDRESS | NODE TYPE | DATA LINK |
|---|---|---|
| 1 | GW | ON |
| 5 | PC | ---- |
| 10 | TA | ON |
| 11 | -DOWN- | OFF |
| 12 | TA | OFF |
| 13 | TA | ON |

NETWORK SYSTEM HAVING A GATEWAY APPARATUS FOR MOMITORING A LOCAL AREA NETWORK

BACKGROUND OF THE INVENTION

1. Field of the Invention

The present invention relates to a network system comprising a gateway apparatus for connecting a wide area network and a local area network (to be referred to as a LAN hereinafter), and a management method therefor.

2. Description of the Prior Art

Figure 12:
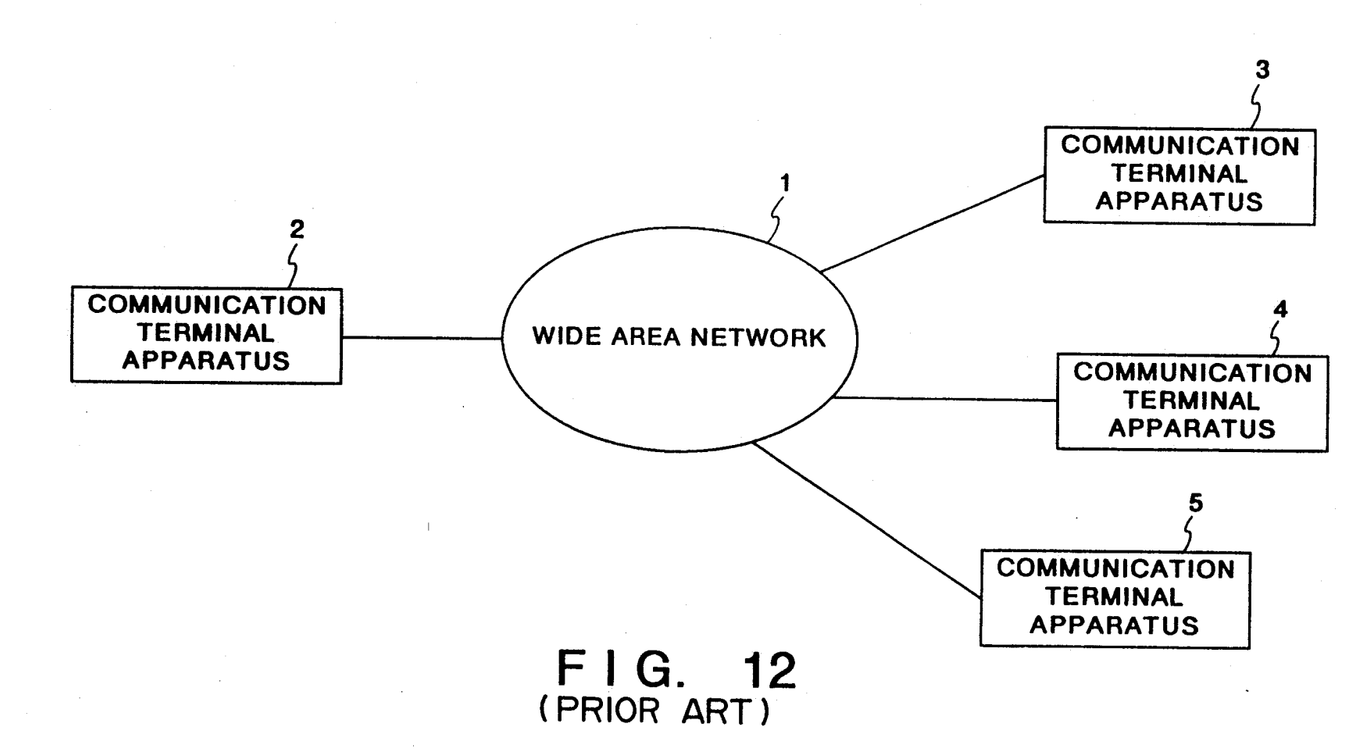
FIGS. 12 and 13 are diagrams of networks for explaining the prior art.

Communication terminals such as facsimile apparatuses arranged at geographically remote locations like the main and branch offices of a certain company are normally connected through a wide area network 1, as shown in FIG. 12.

In FIG. 12, reference numeral 1 denotes the wide area network such as a telephone network or a digital network; 2, denotes a communication terminal apparatus arranged at the head office; and 3, 4, and 5, denote communication terminal apparatuses arranged at branch offices.

Figure 13:
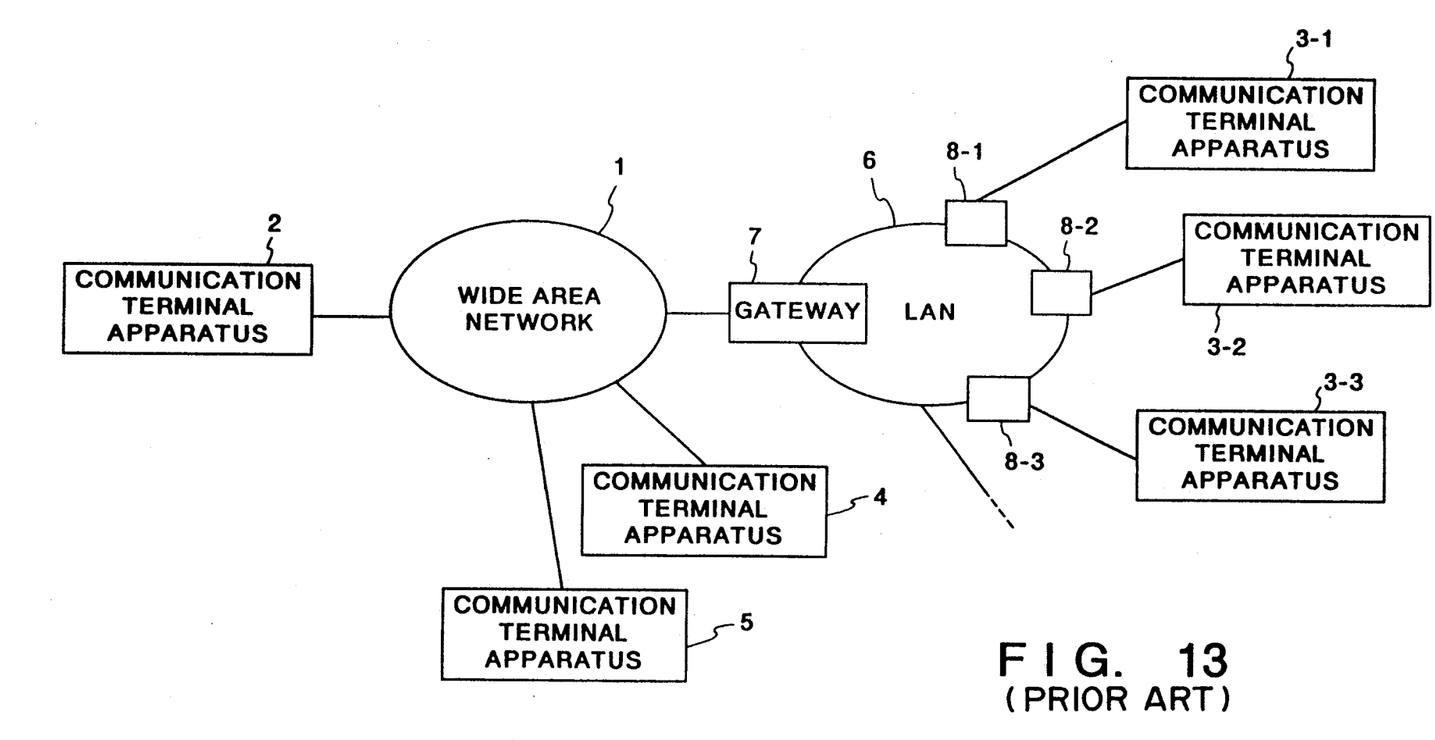

When the size of one office is relatively large and a plurality of communication terminal apparatuses are arranged in one office, the arrangement shown in FIG. 13 is advantageous.

In the arrangement shown in FIG. 13, a plurality of (e.g., three) communication terminal apparatuses 3-1, 3-2, and 3-3 are assumed to be arranged in a single office. Communication is performed inside the office using these communication terminal apparatuses through terminal adapters 8-1, 8-2, and 8-3, and a LAN 6. Communication is performed with other communication terminal apparatuses outside the office, e.g., communication terminal apparatuses 2, 4, 5, and the like through a gateway apparatus 7 and a wide area network 1.

This system utilizes the LAN 6 which allows high-speed communication and does not incur high communication costs for intra-office communication having a high communication frequency, and uses the wide area network 1 only in a communication with an apparatus outside the office. Thus, this system is a rational one.

However, the above-mentioned conventional network system has the following drawbacks.

(1) When the communication terminal apparatuses 2 to 5 are directly connected to the wide area network 1, as shown in FIG. 12, location of a source of an error when a communication error occurs is relatively easy since it can be performed by determining whether the error occurred at the wide area network 1 side or at the terminal side of the system.

However, in the network system including the LAN shown in FIG. 13, errors can also occur in the gateway apparatus 7, the LAN transmission path 6, and terminal adapters 8, and the like.

In this case, when an error occurs, determining its location requires an examination of each type of apparatus in the system, resulting in much labor and time.

(2) In a system required to have high reliability, in order to eliminate the drawback (1) and to allow quick location of a source or an error, a LAN monitoring apparatus is separately connected.

In general, a LAN monitoring apparatus of this type is a special apparatus, and is expensive, thus impairing the economic advantages of the system.

SUMMARY OF THE INVENTION

The present invention has been developed to eliminate the above-mentioned drawbacks. That is, it is an object of the present invention to provide a network system and its associated monitoring method, in which operating conditions of constituent elements of the network system can be simultaneously monitored without a special-purpose LAN monitoring apparatus, or the like, and the location of a source of an error can be easily determined when a communication error occurs.

In order to achieve the above objective, there is provided a network system comprising a local area network capable of connecting a plurality of transmission apparatuses, a gateway apparatus for connecting the local area network to a wide area network, and at least one terminal adapter for connecting the local area network to a communication terminal apparatus, wherein each of the transmission apparatuses comprises monitoring means for monitoring conditions of the connected local area network, and other apparatuses connected to the local area network, and display means for displaying data monitored by the monitoring means, and the apparatus connected to the local area network comprises transmission means for, upon reception of a transmission request of data indicating an operating condition of its own apparatus from another apparatus, transmitting data indicating the operating condition of its own apparatus to the source apparatus.

The monitoring means of the transmission apparatus sequentially outputs, to other apparatuses connected to the connected local area network, the transmission request of management data of the operating conditions of the other apparatuses, receives the operating conditions from the other apparatuses, and causes the display means to simultaneously display the received operating condition. Therefore, the operating conditions of the network system can always be monitored.

Management data of the operating condition of the apparatus connected to the local area network includes address data inherent to its own apparatus, a type of its own apparatus, and data indicating a data link ready state.

The apparatus connected to the local area network comprises a storage table for storing the management data.

In order to achieve the above objective, there is also also provided a network system comprising of a local area network capable of connecting a plurality of transmission apparatuses, a gateway apparatus for connecting the local area network to a wide area network, and at least one terminal adapter for connecting the local area network to a communication terminal apparatus, wherein at least one of the transmission apparatuses comprises management data request means for outputting a transmission request of management data of for operating conditions of the connected local area network and other apparatuses connected to the local area network, and display means for displaying the operating conditions of the other apparatuses sent in accordance with the transmission request of the management data request means, so that the operating conditions of the network system can always be monitored.

The apparatus connected to the local area network comprises transmission means for, upon reception of a transmission request of data indicating an operating condition of its own apparatus from another apparatus, transmitting data indicating the operating condition of its own apparatus to the source apparatus.

Furthermore, in order to achieve the above objective, there is further provided a network management method of a network system comprising of a local area network capable of connecting a plurality of transmission apparatuses, a gateway apparatus for connecting the local area network to a wide area network, and at least one terminal adapter for connecting the local area network to a communication terminal apparatus, wherein each of the transmission apparatuses sequentially acquires data indicating the conditions of the connected local area network, the gateway apparatus, and the terminal adapter, and causes display means to update and display the acquired condition data, so that the operating conditions of the connected local area network, the wide area network, the gateway apparatus, the terminal adapter, and the communication terminal apparatus can be visually monitored at the same time.

Upon reception of a transmission request of its own management data from another apparatus, each of the gateway apparatus and the terminal adapter transmits management data of its own apparatus to the source apparatus, and each of the transmission apparatuses recognizes operating data on the basis of the management data from the gateway apparatus and the terminal adapter.

In the above arrangement, the monitoring means sequentially outputs a transmission request of management data of an operating condition of a corresponding apparatus to apparatuses connected to a connected LAN, receives operating conditions of the gateway apparatus, the wide area network and the terminal adapters to which the gateway apparatus is connected, and the communication terminal apparatuses connected to the terminal adapters, and causes the display means to simultaneously display the operating conditions, so that the operating conditions of the network system can always be monitored.

In this manner, the operating conditions of the wide area network, the LAN, the gateway apparatus, the terminal adapters, the communication terminal apparatuses, and the like can be simultaneously monitored without a special-purpose LAN monitoring apparatus. For this reason, when a communication error occurs, the location of the source of the error can be easily determined.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

An embodiment of the present invention will be described in detail below with reference to the accompanying drawings.

Figure 1:
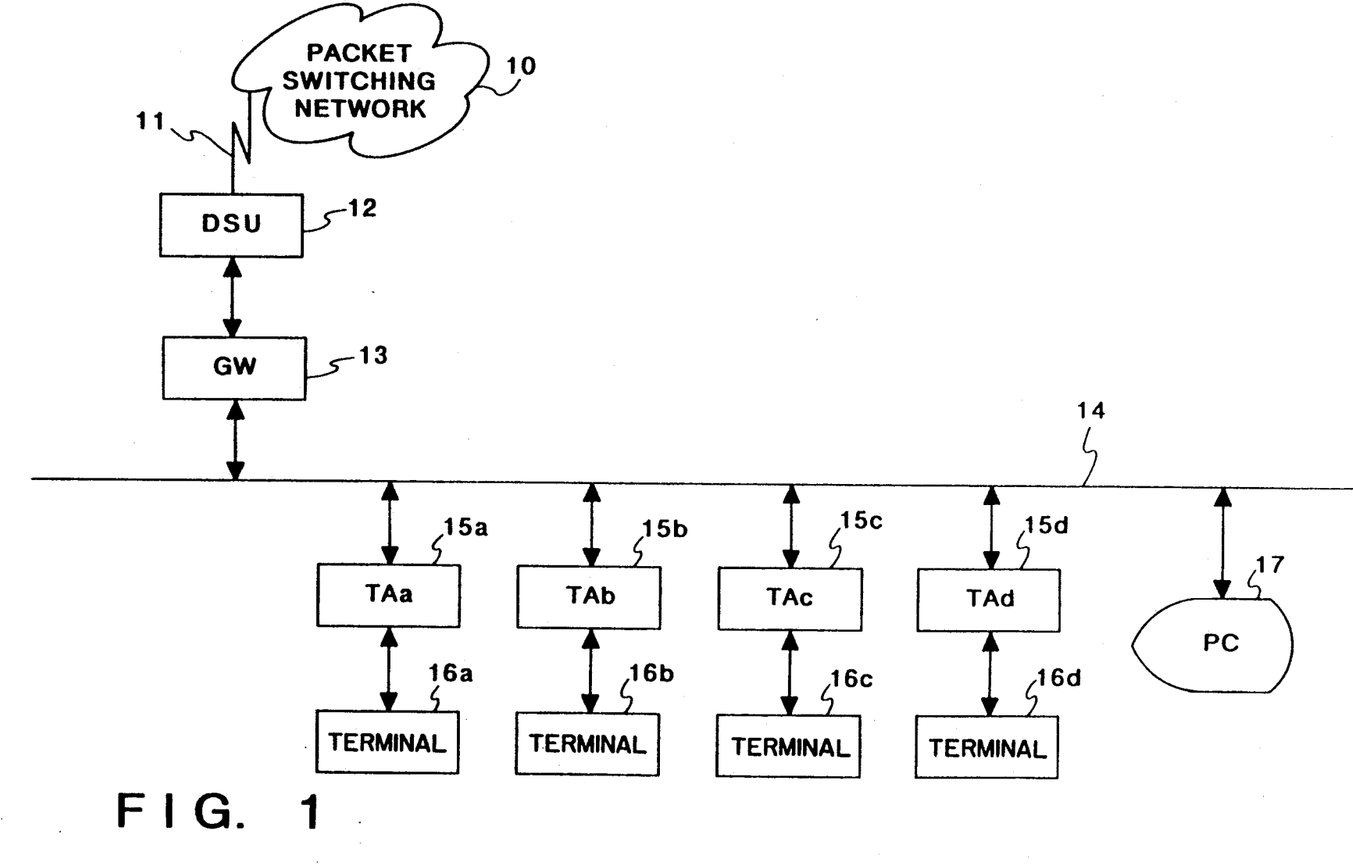
FIG. 1 is a diagram of a system network according to an embodiment of the present invention.

FIG. 1 is a diagram of a network system according to the embodiment of the present invention.

In FIG. 1, reference numeral 10 denotes a public packet switching network; 11 denotes a public line connected to the public packet switching network; 12 denotes a line terminating unit (to be referred to as a DSU hereinafter); 13 denotes a gateway apparatus (to be referred to as a GW hereinafter); 14 denotes a LAN transmission path; 15a to 15d, terminal adapters (to be referred to as TAs hereinafter); 16a to 16d, various communication terminal apparatuses of G4 facsimile apparatuses which satisfy G4 standards; and 17 denotes a versatile personal computer (to be referred to as a PC hereinafter) which serves as a network monitoring apparatus.

Note that various packet communication terminals are connected to the packet switching network 10, and a packet communication can be performed with the system of this embodiment shown in FIG. 1.

Figure 2:
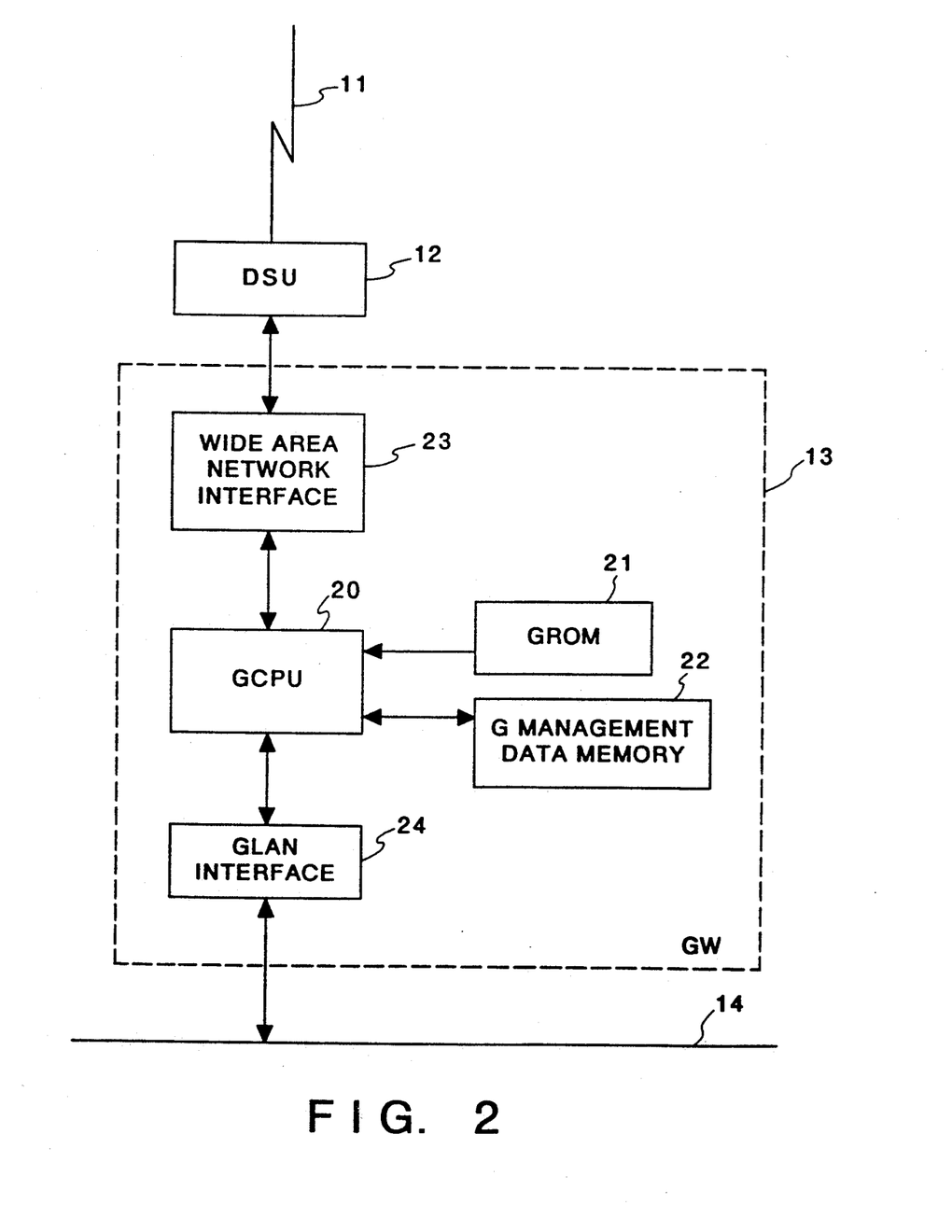
FIG. 2 is a block diagram of a gateway apparatus of the network system according to the embodiment of the present invention.

FIG. 2 is a block diagram showing the detailed arrangement of the GW 13 of the embodiment shown in FIG. 1.

In FIG. 2, reference numeral 11 denotes the public line; 12 denotes the DSU; and 14 denotes the LAN transmission path shown in FIG. 1.

In the GW 13, reference numeral 20 denotes a GCPU for controlling the entire GW in accordance with a program stored in a GROM 21; 21 denotes the GROM for storing a transmission control program, and the like of the GCPU 19; 22 denotes a G management data memory for storing network management data such as a state of the public line 11, a type of its own apparatus, a LAN address, and the like; 23 denotes a wide area network interface for performing processing of (X.25 protocol) as communication specification standards of the public packet switching network of this embodiment; and 24 denotes a GLAN interface for interfacing with the LAN.

Figure 3:
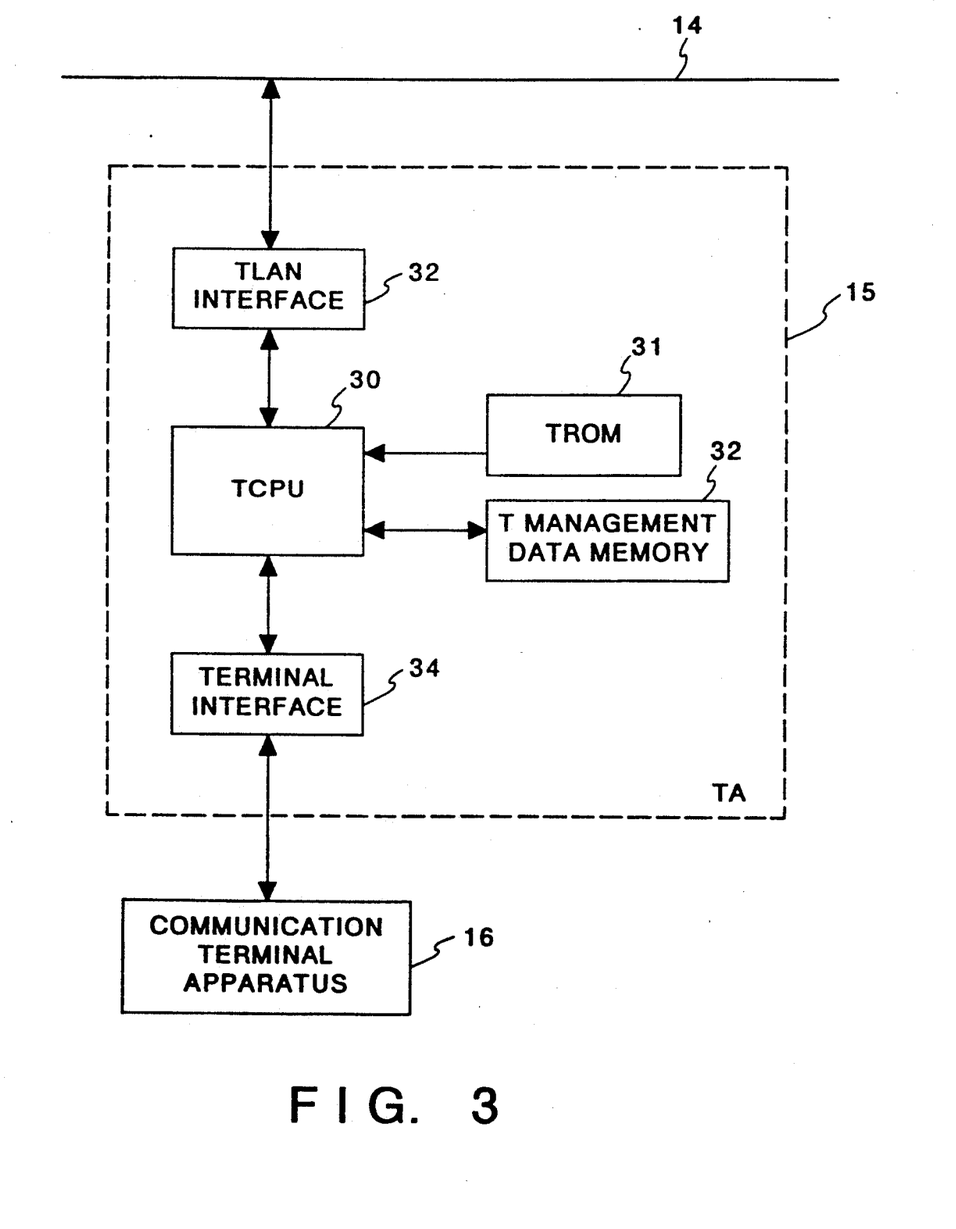
FIG. 3 is a block diagram of a terminal adapter of the network system according to the embodiment of the present invention.

FIG. 3 is a block diagram of one of the TAs (15a to 15d) of the embodiment shown in FIG. 1.

In FIG. 3, reference numeral 14 denotes the LAN transmission path shown in FIG. 1; and 16 denotes a communication terminal apparatus connected to the TA 15.

In the TA 15, reference numeral 30 denotes a TCPU for controlling the entire TA 15 in accordance with a program stored in a TROM 31; 31 denotes the TROM; 32 denotes a T management data memory for storing network management data such as a state of the terminal, a type of its own apparatus, a LAN address, and the like; 33 denotes a TLAN interface for interfacing with the LAN; and 34 denotes a terminal interface for interfacing with the connected communication terminal apparatus 16.

Figure 4:
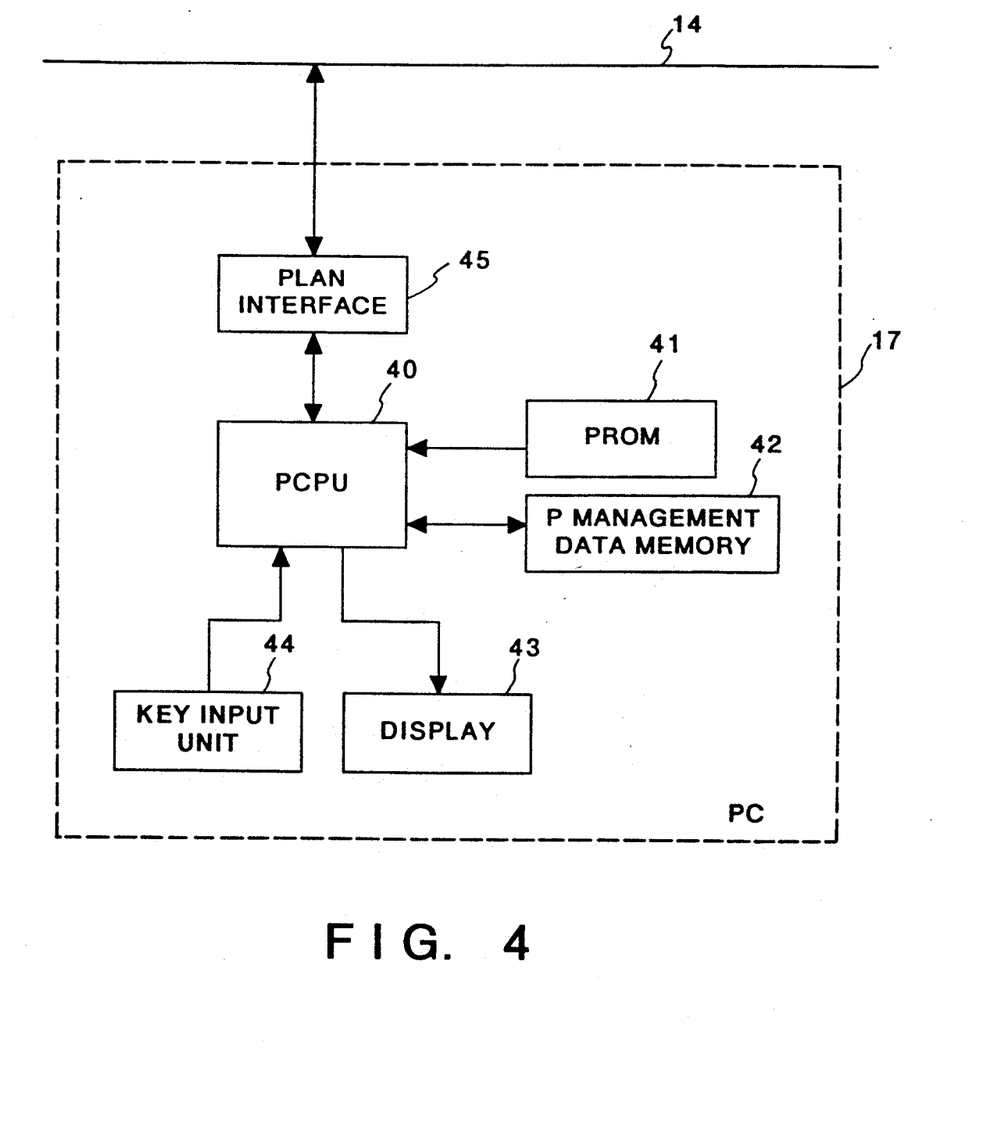
FIG. 4 is a block diagram of a personal computer of the network system according to the embodiment of the present invention.

FIG. 4 is a block diagram of the PC 17 shown in FIG. 1.

In FIG. 4, reference numeral 14 denotes the LAN transmission path shown in FIG. 1.

In the PC 17, reference numeral 40 denotes a PCPU for controlling the entire PC 17 in accordance with a program stored in a PROM 41; 41 denotes the PROM; 42 denotes a P management data memory for storing various network management data; 43 denotes a display comprising a CRT for displaying various data; 44 denotes a key input unit such as a keyboard; and 45 denotes a LAN interface for interfacing with the LAN.

Figure 5:
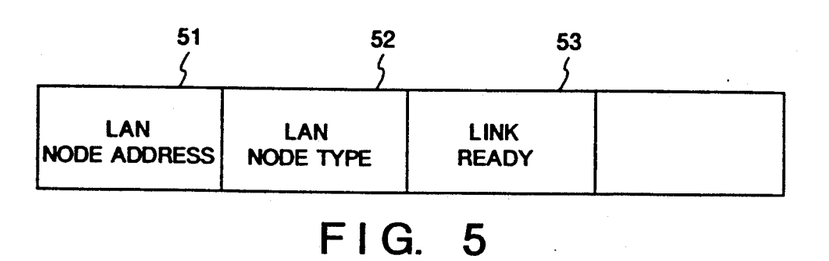
FIGS. 5 and 6 show formats of a management data memory of the network system according to the embodiment of the present invention.

FIG. 5 shows management data stored in the G and T management data memories 22 and 32 respectively in the GW 13 and the TA 15.

In FIG. 5, reference numeral 51 denotes a LAN node address area indicating a LAN address of its own apparatus; 52 denotes a LAN node type area indicating a node type of its own apparatus; and 53 denotes a LINK ready area indicating a data link ready state of the X.25 interface.

Figure 6:
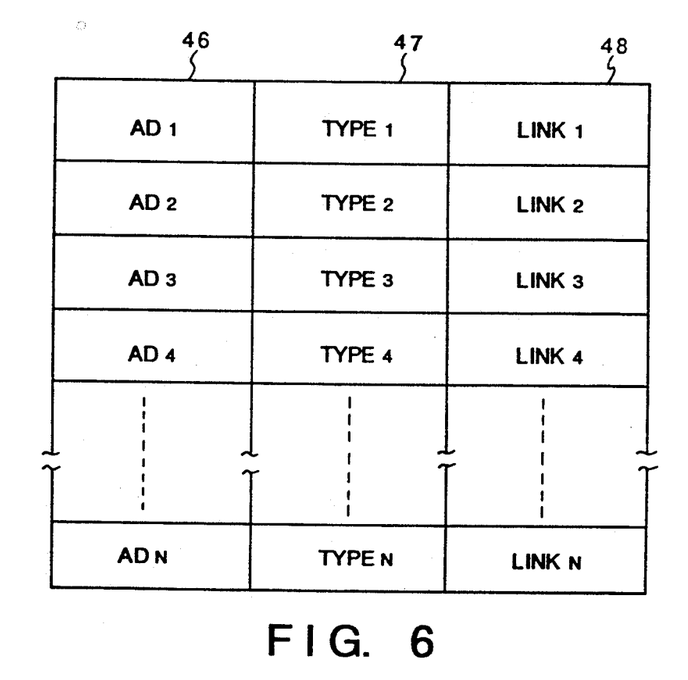

FIG. 6 shows management data stored in the P management data memory 42 in the PC 17.

In FIG. 6, the P management data memory 42 has a table format, and stores various data such as a LAN node address (ADi) 46, a LAN node type (TYPEi) 47, and a LINK ready (LINKi) 48 (i=1 to n).

Figure 7:
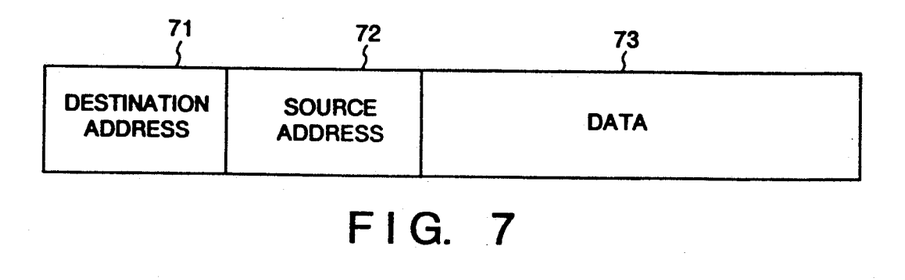
FIG. 7 shows a data format of LAN communication data used in this embodiment.

FIG. 7 shows a communication data format used in the LAN transmission path 14 of this embodiment.

In FIG. 7, reference numeral 71 denotes a destination address; 72 denotes a source address; and 73 denotes a data area (text area) in which various communication control commands, transmission/reception data, and the like are written.

Network management processing of this embodiment with the above arrangement will be described below with reference to the flow charts of FIGS. 8A, 8B and 9.

Figure 8A:
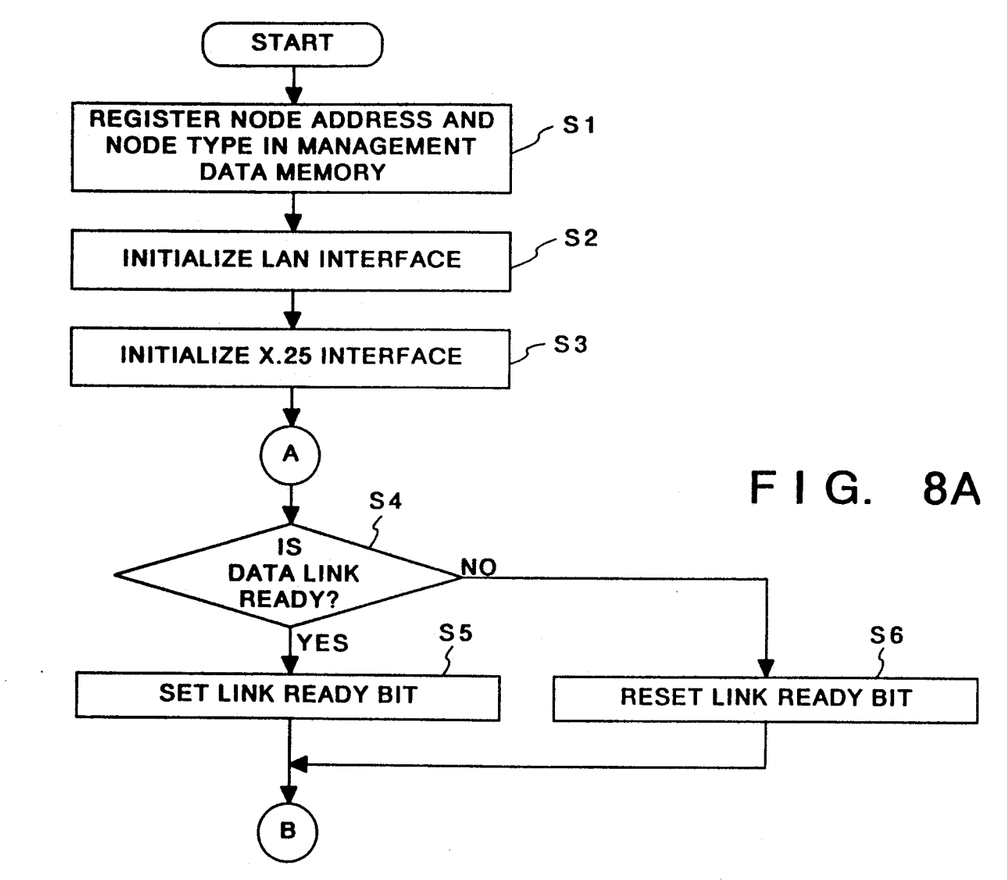
FIGS. 8A, 8B and 9 are flow charts of network management control of this embodiment.
Figure 8B:
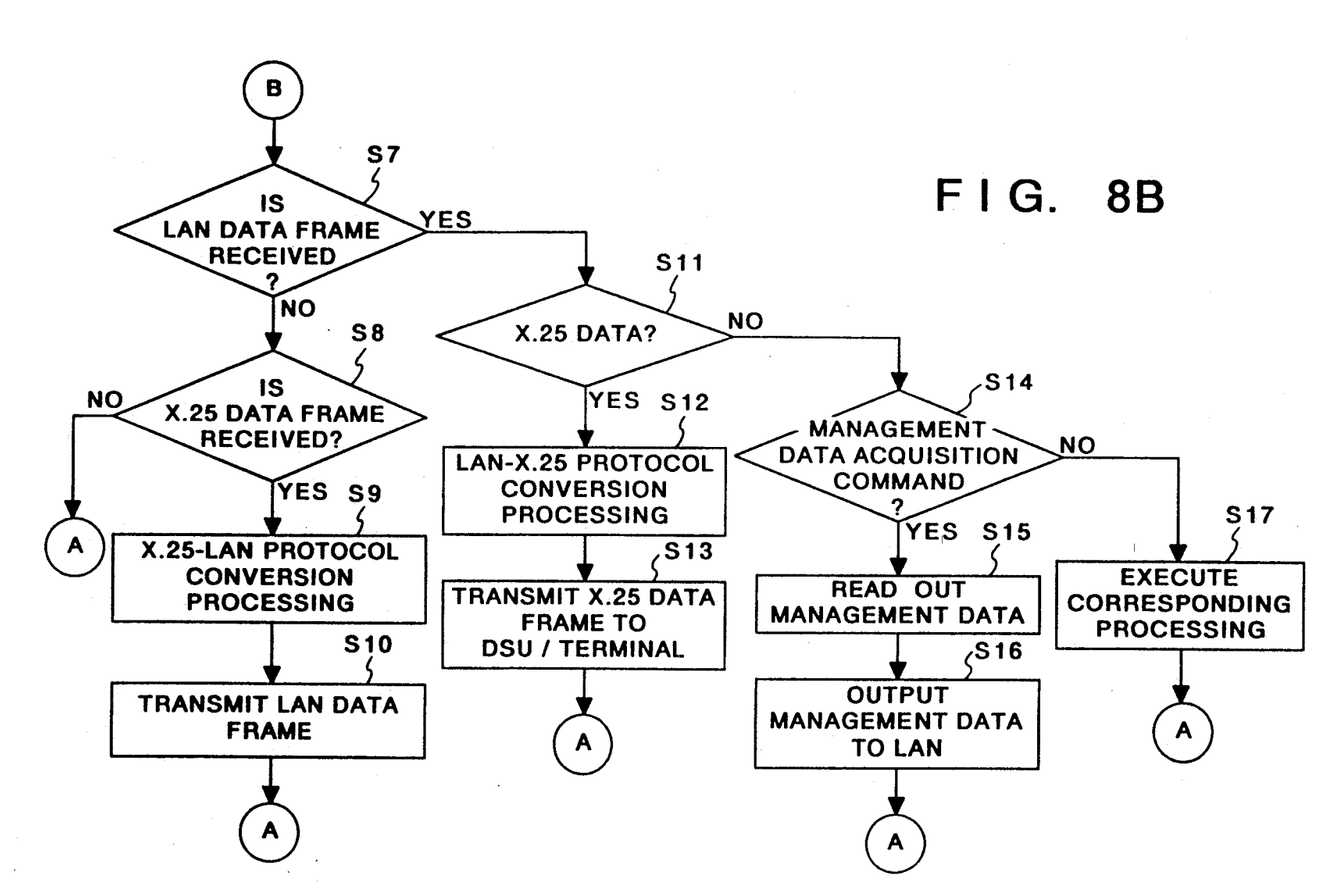
Figure 9:
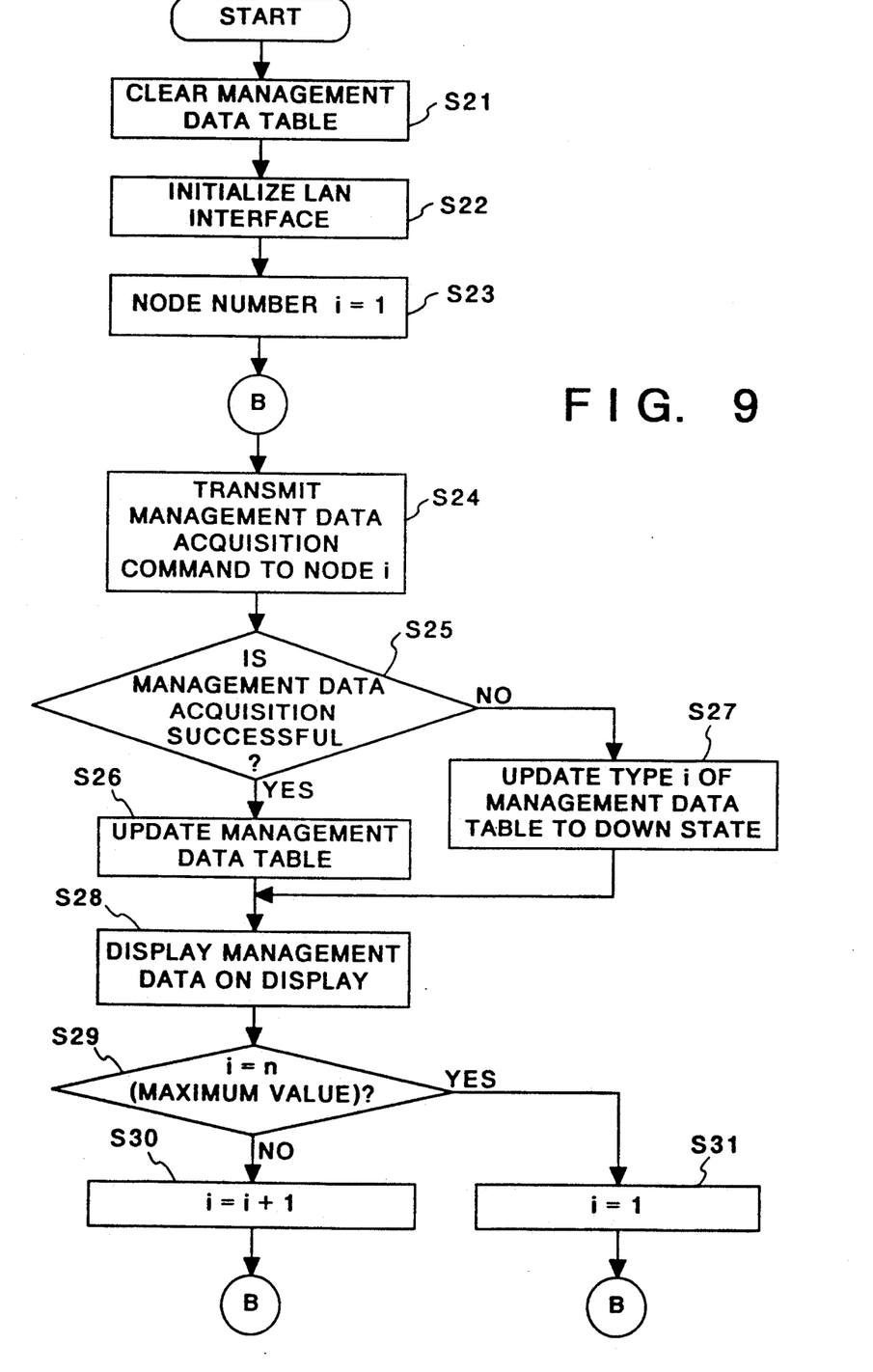

FIG. 8A and 8B are flow charts showing network management processing performed by the nodes, e.g., the GW 13, the TAs 15, and the like, and FIG. 9 is a flow chart showing network monitoring processing in the PC 17.

In the embodiment shown in FIG. 1, node addresses and node types of the transmission apparatuses (to be referred to as nodes hereinafter) connected to the LAN transmission path 14 are as shown in Table 1 below.

TABLE 1

| Node No. | Node 1 | Node 2 | Node 3 | Node 4 | Node 5 | Node 6 |
|---|---|---|---|---|---|---|
| Node Address | 1 | 5 | 10 | 11 | 12 | 13 |
| Node Type | GW | PC | TA | TA | TA | TA |

The network management processing performed by the nodes such as the GW 13, the TAs 15, and the like will be described below with reference to FIGS. 8A and 8B. Since the GW 13 and the TA 15 perform substantially the same network management processing, the operation of the GW 13 will be exemplified below.

When the power switch of the GW 13 is turned on, the node address and the node type of its own apparatus corresponding to Table 1 are registered in the LAN node address area S1 and the LAN node type are 52 of the G management data memory 22 in step S1. That is, data "1" as the node address and data "GW" as the node type are written in the corresponding areas.

In step S2, initialization processing of the GLAN interface 24 is executed. Upon completion of the initialization processing, transmission/reception processing for the LAN transmission path 14 is enabled. For this reason, x.25 interface initialization processing is performed in step S3 to try to set a data link.

More specifically, a SABM (Set Asynchronous Balanced Mode) command is transmitted to the DSU 12 through the wide area network interface 23, and a UA (unnumbered Acknowledgement) response from the DSU 12 is waited. When the public packet switching network 11 and the DSU 12 are normal, since the UA response is sent back, it is then checked in step S4 if the UA response is sent and a data link is ready. If YES in step S4, the flow advances to step S5, and the LINK ready bit 53 in the G management data memory 22 is set. Thereafter, the flow advances to step S7.

However, if NO in step S4, i.e., if no UA response is received due to a trouble in the DSU 12, or if a data link is not ready upon reception of, e.g., a DISC (Disconnect) command after the data link is ready once, the data link is disconnected, and the flow advances from step S4 to step S6. In step S6, the LINK ready bit 53 in the G management data memory 22 is reset. The flow then advances to step S7.

In step S7, it is checked if the GLAN interface 24 receives a LAN data frame from the LAN transmission path 14. If NO in step S7, it is checked in step S8 if an X.25 data frame is received. If NO in step S8, the flow returns to step S4, and the control waits while monitoring the data link ready state until the LAN or X.25 data frame is received.

When the X.25 data frame is received, i.e., when the X.25 data frame is input from the public packet switching network 11 to the wide area network interface 23 through the DSU 12, the flow advances from step S8 to step S9 to execute conversion processing from an X.25 protocol to an LAN protocol. In step S10, the converted LAN frame data is transmitted onto the LAN transmission path 14 through the GLAN interface 24. The flow then returns to step S4 to prepare for reception of the next data frame.

On the other hand, when the LAN data frame is received, the flow advances from step S7 to step S11 to check if the received LAN data frame is X.25 data. If YES in step S11, data transmitted from the communication terminal apparatus 16 to the TA 15 according to the X.25 protocol is received by the terminal interface 34 in the TA 15, and is converted according to the LAN protocol by the TCPU 30. Thereafter, the converted data is output onto the LAN transmission path 14 through the TLAN interface 33. For this reason, the GW 13 which received the X.25 data executes the conversion processing from the LAN protocol to the X.25 protocol in step S12. In step S13, the X.25 data frame from the communication terminal apparatus 16 is transmitted to the DSU 12 in accordance with the converted X.25 protocol. The DSU 12 then transmits this X.25 data frame to the packet switching network 10.

If it is determined in step S11 that the received LAN data frame is not the X.25 data, the flow advances from step S11 to step S14 to check if the received data frame is a management data acquisition command. If YES in step S14, the flow advances to step S15 to read out management data from the G management data memory 22. In step S16, the readout management data is sent onto the LAN transmission path 14, and the flow then returns to step S4.

However, if NO in step S14, the flow advances to step S17 to execute processing corresponding to the received data. The flow then returns to step S4.

Note that the TA 15 executes processing in step S7→step S11→step S12→step S13 in the same manner as in the GW 13, and transfers the X.25 data frame to the communication terminal apparatus 16.

The basic data communication processing in the network system of this embodiment has been described. A network management operation as the characteristic feature of this embodiment will be described below with reference to the flow chart shown in FIG. 9.

In the system of this embodiment shown in FIG. 1, the PC 17 is a versatile personal computer which realizes the network monitoring function. The network management operation as the characteristic feature of this embodiment is executed by the PC 17.

When the power switch of the PC 17 is turned on, the management data table in the P management data memory 42 is cleared in step S21. In step S22, the PLAN interface 45 is initialized to enable transmission/reception of data to/from the LAN transmission path 14.

In step S23, a node No. "i" is set to be "1" as an initial value. The node No. "i" is a pointer variable indicating a node for which management data are to be acquired. The flow then advances to step S24, and a management data acquisition command to the node 1 (i=1) is transmitted onto the LAN transmission path 14 through the PLAN interface 45. From Table 1 since the node address of the node 1 (GW 13) is "1" and the node address of the PC 17 (node 2) is "5", the management data acquisition command in this case corresponds to a LAN data frame in which "1" is written as a value of the destination address area 71 (FIG. 7), "5" is written as a value of the source address area 72, and the management data acquisition command is written in the data area 73.

When the GW 13 (node 1) is normally operated, the management data of the GW 13 is sent from the GW 13 as a response to the management data acquisition command. For this reason, it is monitored in step S25 whether or not the LAN data frame including management data is normally received (i.e., if management data acquisition is successful). If YES in step S25, the flow advances to step S26, and the management data included in the received LAN data frame is written in the management data table in the P management data memory 42.

When the received management data is one for node "1", contents such as $AD_1=1$, $TYPE_1=GW$, and $LINK_1=1$ ("1" indicates a data link ready state) are written. The flow then advances to step S28.

When trouble, e.g., disconnection of the power switch of the GW 13, occurs, since management data cannot be acquired in step S25, the flow advances to step S27. In step S27, the data $TYPE_1$ in the management data table is updated to a down state (e.g., a value of "0"), and the flow then advances to step S28.

In step S28, the contents of the management data table are read out, and are output to the display 43 in the above-mentioned display format.

In step S29, it is checked if the node No. "i" is a maximum number "n" (in this embodiment, "6"). If NO in step S29, the flow advances to step S30 to increment the node No. "i" by 1. The flow then returns to step S24 to execute management data acquiring processing of the next node.

However, if YES in step S29, the flow advances to step 531, and the node No. "i" is reset to the initial value (i.e., "1"). The flow then returns to step 524, and the above-mentioned management data acquiring processing in step 524 and subsequent steps is repeated.

The operation of the GW 13 or the TA 15 for sending back management data stored in the management data memory 22 or 32 of its own apparatus upon reception of the management data acquisition command is started upon reception of the LAN data frame in step S7 in FIGS. 8A and 8B. The corresponding node checks if the management data acquisition command issued by the PC 17 is assigned to its own apparatus. If the node recognizes that the command is assigned to its own apparatus, it identifies it to be the management data command in steps S11 and S14. In the processing of step S15, the management data is read out from the management data memory 22 or 32 of its own apparatus. In step S16, the node sends back the readout management data to the source apparatus (in this case, the PC 17).

With the above-mentioned processing, the operating conditions of the apparatuses constituting the network system of this embodiment can be monitored in real time on the screen of the PC 17.

Figure 10:
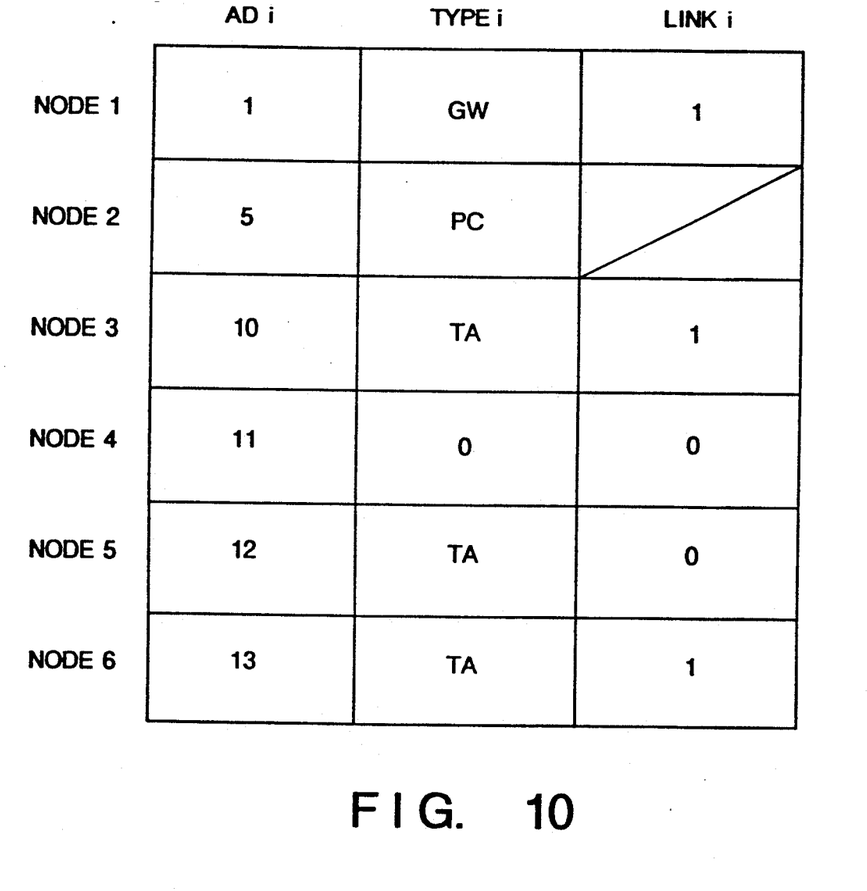
FIG. 10 shows a state management data table of this embodiment.
Figure 11:
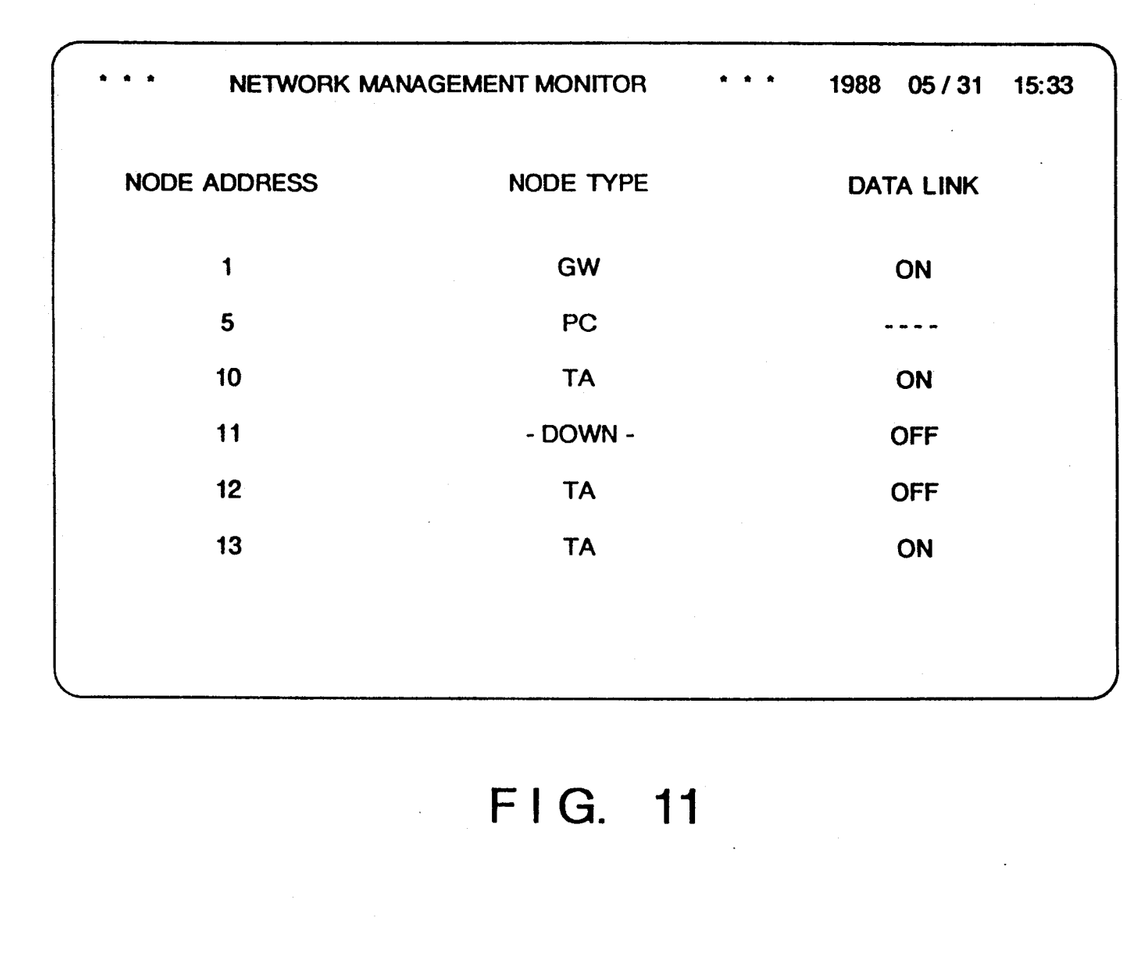
FIG. 11 shows an example of a display screen of the personal computer of this embodiment.

When the power switches of the terminals connected to the node 4 (TA) and the node 5 are kept off, the contents of the management data table in the PC 17 are as shown in FIG. 10. The display screen of the display 43 in this case is as shown in FIG. 11.

For this reason, an operator can immediately recognize the abnormality of the TA of the node address "11", and the abnormality of the terminal connected to the TA of the node addresss "12".

Another Embodiment

In the above embodiment, the public packet switching network is used as the wide area network. However, the present invention can be applied to various other wide area networks such as a telephone network, a digital network, an ISDN (Integrated Services Digital Network), and the like.

According to this embodiment, as described above, since the operating conditions of the various apparatuses constituting the network system can be monitored in real time on the screen of the personal computer, location of a source of when an error occurs can be greatly facilitated.

The system of this embodiment does not require an expensive network monitoring apparatus, and can be realized by an inexpensive personal computer. Thus, an economical network system can be constituted.

According to the present invention, since operating conditions of various apparatuses constituting the network system can be monitored in real time using a transmission apparatus, the location of a source of trouble when trouble occurs can be greatly facilitated.

Furthermore, the present invention does not require an expensive network monitoring apparatus, and can be realized by an inexpensive personal computer. Thus, an economical network system can be constituted.

As many apparently widely different embodiments of the present invention can be made without departing from the spirit and scope thereof, it is to be understood that the invention is not limited to the specific embodiments thereof except as defined in the appended claims.

What is claimed is:

1. A network system including:
   a plurality of communication apparatuses connected to each other through a local area network; and
   a gateway apparatus for connecting the local area network to another network,
   wherein data transmission is carried out between said communication apparatuses via the local area network and between the local area network and the another network via said gateway apparatus,
   wherein said gateway apparatus repeatedly checks whether the local area network is ready to be linked for data transmission to the another network via a data link;
   wherein one of said communication apparatuses repeatedly transmits a request to said gateway apparatus for the transmission of indicating data, indicating that the local area network is ready to be linked to the another network via the data link,
   wherein said gateway apparatus transmits the indicating data to said one of said communication apparatuses upon reception of the request;
   wherein said one of said communication apparatuses displays data representing the condition that the local area network is ready to be linked to the another network via a data link in accordance with the indicating data transmitted from said gateway apparatus, and
   wherein said gateway apparatus stores data representing the current operating condition of the data link.

2. A network system according to claim 1, wherein said one of said communication apparatuses stores the indicating data.

3. A network system according to claim 1, wherein said one of said communication apparatuses further displays the operating condition of said plurality of communication apparatuses.

4. A network system including:
   a plurality of communication apparatuses connected to each other trough a local area network; and
   a monitoring apparatus for monitoring the operating condition of said plurality of communication apparatuses,
   wherein data transmission is carried out between said communication apparatuses via the local area network,
   wherein each of said communication apparatuses repeatedly checks its operating condition;
   wherein said monitoring apparatus sequentially transmits to said plurality of communication apparatuses a request for the transmission of data indicating the operating condition of each of said communication apparatuses;
   wherein each of said communication apparatuses transmits indicating data indicating its operating condition to said monitoring apparatus upon reception of the request;
   wherein said monitoring apparatus displays data representing the operating conditions of said plurality of communication apparatuses in accordance with the indicating data transmitted from said plurality of communication apparatuses, and
   wherein each of said communication apparatuses stores the data indicating its operating condition.

5. A network according to claim 4, wherein said monitoring apparatus stores the indicating data indicating the operating conditions of said plurality of communication apparatuses.

6. A network according to claim 4, wherein said monitoring means displays data representing the operating conditions of said plurality of communication apparatuses at the same time.

* * * * *

UNITED STATES PATENT AND TRADEMARK OFFICE
CERTIFICATE OF CORRECTION

PATENT NO. : 5,079,765
DATED : January 7, 1992
INVENTOR(S) : YASUO NAKAMURA

It is certified that error appears in the above-identified patent and that said Letters Patent is hereby corrected as shown below:

On the title page:

IN [54] TITLE

"MOMITORING" should read --MONITORING--.

IN [56] REFERENCES CITED

Under U.S. PATENT DOCUMENTS, "4,897,837  7/1989  Morales" should read --4,847,837  7/1989  Morales--.

COLUMN 1

Line 3, "MOMITORING" should read --MONITORING--.
Line 67, "or" should read --of--.

COLUMN 8

Line 11, "step 531," should read --step S31,--.
Line 12, "step 524" should read --step S24--.
Line 14, "step 524" should read --step S24--.

COLUMN 10

Line 10, "trough" should read --through--.
Line 35, "network" should read --network system--.
Line 39, "network" should read --network system--.

UNITED STATES PATENT AND TRADEMARK OFFICE
CERTIFICATE OF CORRECTION

PATENT NO. : 5,079,765

DATED : January 7, 1992

INVENTOR(S) : YASUO NAKAMURA

It is certified that error appears in the above-identified patent and that said Letters Patent is hereby corrected as shown below:

<u>COLUMN 10</u>

Line 40, "monitoring means" should read --monitoring apparatus--.

Signed and Sealed this

Eighth Day of June, 1993

Attest:

MICHAEL K. KIRK

*Attesting Officer*      *Acting Commissioner of Patents and Trademarks*